(12) United States Patent
Hayashi

(10) Patent No.: US 6,655,483 B2
(45) Date of Patent: Dec. 2, 2003

(54) ELECTRIC MOTOR VEHICLE

(75) Inventor: Kunihiro Hayashi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/897,147

(22) Filed: Jun. 29, 2001

(65) Prior Publication Data

US 2002/0020570 A1 Feb. 21, 2002

(30) Foreign Application Priority Data

Jul. 31, 2000 (JP) .................................. 2000-230250

(51) Int. Cl.⁷ .................................................. B60K 1/00
(52) U.S. Cl. ................. 180/65.1; 180/68.1; 297/344.18
(58) Field of Search .......................... 180/65.1, DIG. 4, 180/65.2, DIG. 5, 65.4, 65.3, 65.8, 208, 210, 215, 220, 229, 286, 289, 329, 330, 217, 90.8, 315; 297/344.18, 344.17, 344.14; 74/492, 493, 512

(56) References Cited

U.S. PATENT DOCUMENTS

| | | | | |
|---|---|---|---|---|
| 3,043,389 A | * | 7/1962 | Steinberg | 280/DIG. 5 |
| 3,166,282 A | * | 1/1965 | Nolan | 297/344.18 |
| 3,305,264 A | * | 2/1967 | Gunn | 297/344.18 |
| 4,332,415 A | * | 6/1982 | Williams | 280/DIG. 5 |
| 4,577,722 A | * | 3/1986 | Schibisch | 180/315 |
| RE34,822 E | * | 1/1995 | Mattson | 297/344.18 |
| 5,518,081 A | * | 5/1996 | Thibodeau | 180/65.1 |
| 5,647,450 A | * | 7/1997 | Ogawa et al. | 180/68.4 |
| 5,868,573 A | * | 2/1999 | Kerby et al. | 434/29 |
| 5,918,692 A | * | 7/1999 | Sekita et al. | 180/65.1 |
| 5,921,341 A | * | 7/1999 | Atkins | 180/217 |
| 5,947,222 A | * | 9/1999 | Yamaoka et al. | 180/210 |
| 5,960,901 A | * | 10/1999 | Hanagan | 180/65.1 |
| 6,042,170 A | * | 3/2000 | Yamaoka et al. | 292/303 |
| 6,189,636 B1 | * | 2/2001 | Kikukawa | 180/65.1 |
| 6,276,480 B1 | * | 8/2001 | Aregger | 180/213 |
| 6,293,610 B1 | * | 9/2001 | Howard | 180/908 |
| 6,313,394 B1 | * | 11/2001 | Shugar et al. | 180/65.1 |
| 6,345,676 B1 | * | 2/2002 | Huntsberger et al. | 180/65.1 |

FOREIGN PATENT DOCUMENTS

| | | |
|---|---|---|
| JP | 9-309343 | 12/1997 |
| JP | 1997-309343 | 12/1997 |

* cited by examiner

Primary Examiner—Brian L. Johnson
Assistant Examiner—Han Phan
(74) Attorney, Agent, or Firm—Darby & Darby

(57) ABSTRACT

An electric motor vehicle includes: a floor frame with the front and rear portions raised; four wheels arranged, two at the front and two at the rear of the floor frame; a steering handle projected upward in the front portion for steering the front two wheels; an electric motor for driving the two rear wheels; an inverted U-shaped seat frame projected upward in the rear portion; and a seat with a backrest, adjustable in height and mounted on the seat frame. A rear-side housing is attached on the rear side of the seat frame. In this housing the electric motor, a controller and a charger are arranged in this order from the bottom while a cooling fan with a louver is arranged in the upper portion of the housing.

15 Claims, 6 Drawing Sheets

ELECTRIC MOTOR VEHICLE

BACKGROUND OF THE INVENTION

(1) Field of the Invention

The present invention relates to an electric motor vehicle which allows the user to ride thereon being perchingly seated on the seat having a short front-to-rear dimension and leaning against the backrest in an almost upright posture.

(2) Description of the Prior Art

An electric motor vehicle includes three or four wheels, a steering handle for controlling one or a pair of front wheels and an electric motor which drives a pair of rear wheels. A battery, controller, electric motor and other necessary parts are arranged inside the housing formed in the rear part of the vehicle while a seat is mounted on the top of the cover so as to allow the user to be seated thereon and drive the vehicle.

As a special example, there is a configuration in which the user rides on the vehicle with the lower half of their body fixed (Japanese Patent Application Laid-Open Hei 10 No. 57425).

A typical electric motor vehicle is configured so that the user drives the vehicle whilst being seated on the seat provided on the cover top of the rear portion which incorporates the functional parts. Since the user can drive the vehicle whilst being seated deeply and securely on the seat, the driving is stable and it is convenient for senior users who have a weak lower body. However, because the user is deeply seated, the point of view is so low that it is inconvenient for making conversation with some one who walks alongside because of the difference in level of view.

The configuration disclosed in Japanese Patent Application Laid-Open Hei 10 No. 57425 where the user rides on the vehicle with the lower half of their body fixed is useful for a user seriously disabled, but is unsuitable for a senior who is generally in good health but has just a weak lower body.

SUMMARY OF THE INVENTION

It is therefore an object of the present invention to provide an electric motor vehicle which allows the user to ride thereon being perchingly seated on the seat having a short front-to-rear dimension and leaning against the backrest in an almost upright position so as to offer the same level of view as a companion walking alongside and hence provide convenience for conversation with the companion, and which is suitable for senior people who have a weak lower body.

In order to achieve the above object, the present invention is configured as follows:

In accordance with the first aspect of the present invention, an electric motor vehicle includes: a floor frame with its front and rear portions raised; four wheels arranged, two at the front and two at the rear of the floor frame; a steering handle projected upward in the front portion for steering the front two wheels; an electric motor for driving the two rear wheels; a seat frame projected upward in the rear portion; and a seat with a backrest, adjustable in height and mounted on the seat frame.

In accordance with the second aspect of the present invention, the electric motor vehicle having the above first feature further includes: a rear-side housing attached in the rear of the seat frame, wherein the electric motor, a controller and a charger are arranged in that order from the bottom while a cooling fan with a louver is arranged in the upper portion.

In accordance with the third aspect of the present invention, the electric motor vehicle having the above first feature is characterized in that the seat frame is inclined rearward so that the top of the seat frame is positioned in the rear and the seat is positioned in front of the rear wheel axis when the seat is set at the topmost position.

In accordance with the fourth aspect of the present invention, the electric motor vehicle having the above second feature is characterized in that the seat frame is inclined rearward so that the top of the seat frame is positioned in the rear and the seat is positioned in front of the rear wheel axis when the seat is set at the topmost position.

In accordance with the fifth aspect of the present invention, the electric motor vehicle having the above first feature is characterized in that the position of the seat can be automatically or manually moved up and down by actuating a lever projected on the side of the seat.

In accordance with the sixth aspect of the present invention, the electric motor vehicle having the above second feature is characterized in that the position of the seat can be automatically or manually moved up and down by actuating a lever projected on the side of the seat.

In accordance with the seventh aspect of the present invention, the electric motor vehicle having the above third feature is characterized in that the position of the seat can be automatically or manually moved up and down by actuating a lever projected on the side of the seat.

In accordance with the eighth aspect of the present invention, the electric motor vehicle having the above fourth feature is characterized in that the position of the seat can be automatically or manually moved up and down by actuating a lever projected on the side of the seat.

In accordance with the ninth aspect of the present invention, the electric motor vehicle having the above first feature is characterized in that a battery storage portion is arranged in the center of the floor frame and covered by a floor cover.

In accordance with the tenth aspect of the present invention, the electric motor vehicle having the above second feature is characterized in that a battery storage portion is arranged in the center of the floor frame and covered by a floor cover.

In accordance with the eleventh aspect of the present invention, the electric motor vehicle having the above first feature is characterized in that heat discharged from the electric motor and controller is adapted to flow under the seat into a cooling fan.

In accordance with the twelfth aspect of the present invention, the electric motor vehicle having the above second feature is characterized in that heat discharged from the electric motor and controller is adapted to flow under the seat into the cooling fan.

In accordance with the thirteenth aspect of the present invention, the electric motor vehicle having the above second feature is characterized in that the cooling fan with a louver is adapted to be pivotally opened so as to allow a reel cord for charging to be pulled out.

In accordance with the fourteenth aspect of the present invention, the electric motor vehicle having the above second feature further includes: a stop lamp arranged at the top center of the rear-side housing with a pair of turn indicator lamps on both sides thereof.

In accordance with the fifteenth aspect of the present invention, the electric motor vehicle having the above first feature further includes: an extended braking pedal is arranged at the center on the front inclined area of the floor frame with a pair of accelerator pedals arranged on the left and right sides thereof.

In accordance with the sixteenth aspect of the present invention, the electric motor vehicle having the above second feature further includes: an extended braking pedal is arranged at the center on the front inclined area of the floor frame with a pair of accelerator pedals arranged on the left and right sides thereof.

In accordance with the seventeenth aspect of the present invention, the electric motor vehicle having the above first feature is characterized in that an extended accelerator and brake combined pedal which accelerates the vehicle when it is pressed down and retards the vehicle when it is released is arranged on the front inclined area of the floor frame.

In accordance with the eighteenth aspect of the present invention, the electric motor vehicle having the above second feature is characterized in that an extended accelerator and brake combined pedal which accelerates the vehicle when it is pressed down and retards the vehicle when it is released is arranged on the front inclined area of the floor frame.

In the electric motor vehicle of the present invention, the rider rides on the vehicle in an almost standing posture being perchingly seated on the seat and leaning on the backrest whilst gripping the steering handle. Therefore, this configuration provides convenience for making conversation with a companion who is walking alongside because the user is able to face the companion at the same level of view. Further, since the seat can be adjusted up and down in accordance with the user's build and/or the level of view of the companion, this is convenient. Since the electric motor and other functional parts are housed inside the rear-side housing on the rear side of the seat frame, this makes the vehicle stylish. When a well-built person rides on the vehicle, the seat can be shifted to the rear, so that this configuration is able to accommodate the seating of any user at the best position relative to the steering handle and other components. Further, since the seat is laid out in front of the rear wheel axis, the vehicle presents good stability. The seat can be easily adjusted up and down in accordance with the user's physique.

Further, since the heavy batteries can be accommodated at the low position and covered by the floor cover, the vehicle presents good stability and appearance.

The heat radiation from the electric motor and controller can be used for heating the seat in winter.

It is a feature of the present invention that a reel cord can be pulled out to be connected to a power supply, this is advantageous for charging the batteries.

According to one configuration of the present invention, the user is able to notify their intention to those around when on public roads.

Finally, according to one configuration of the present invention, since accelerating and braking operations can be made by either the left or right foot, this feature provides convenience.

DESCRIPTION OF THE PREFERRED EMBODIMENTS

The embodiment of the present invention will hereinafter be explained with reference to FIGS. 1 through 8.

Figure 3:
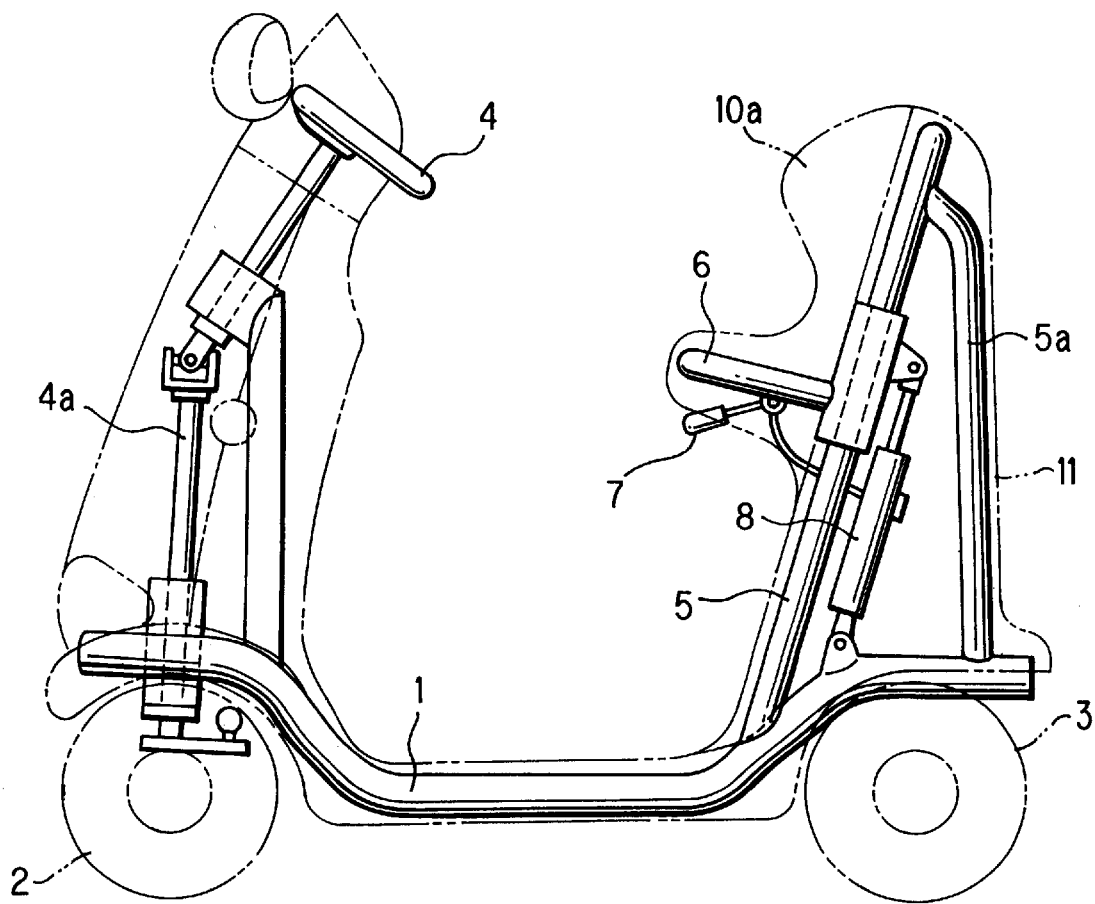
FIG. 3 is a side view mainly showing the relationship between the frame, steering handle and seat of the embodiment of the present invention.

As shown in FIG. 3, a floor frame 1 has an overall U-shape when viewed from the side, with its front and rear high and its center low. Pairs of front wheels 2 and rear wheels 3 are arranged in the front and rear.

A steering shaft 4a for turning the front wheels 2 to the right or left for steerage is arranged upright at the front center of floor frame 1. This steering shaft is joined to a steering handle 4 with a universal joint interposed therebetween. Floor frame 1 is approximately formed into a bow shape with its front and rear ends bent upward, when viewed from the side. The aforementioned front wheels 2 and rear wheels 3 are arranged underneath in the front and rear portions.

Figure 4:
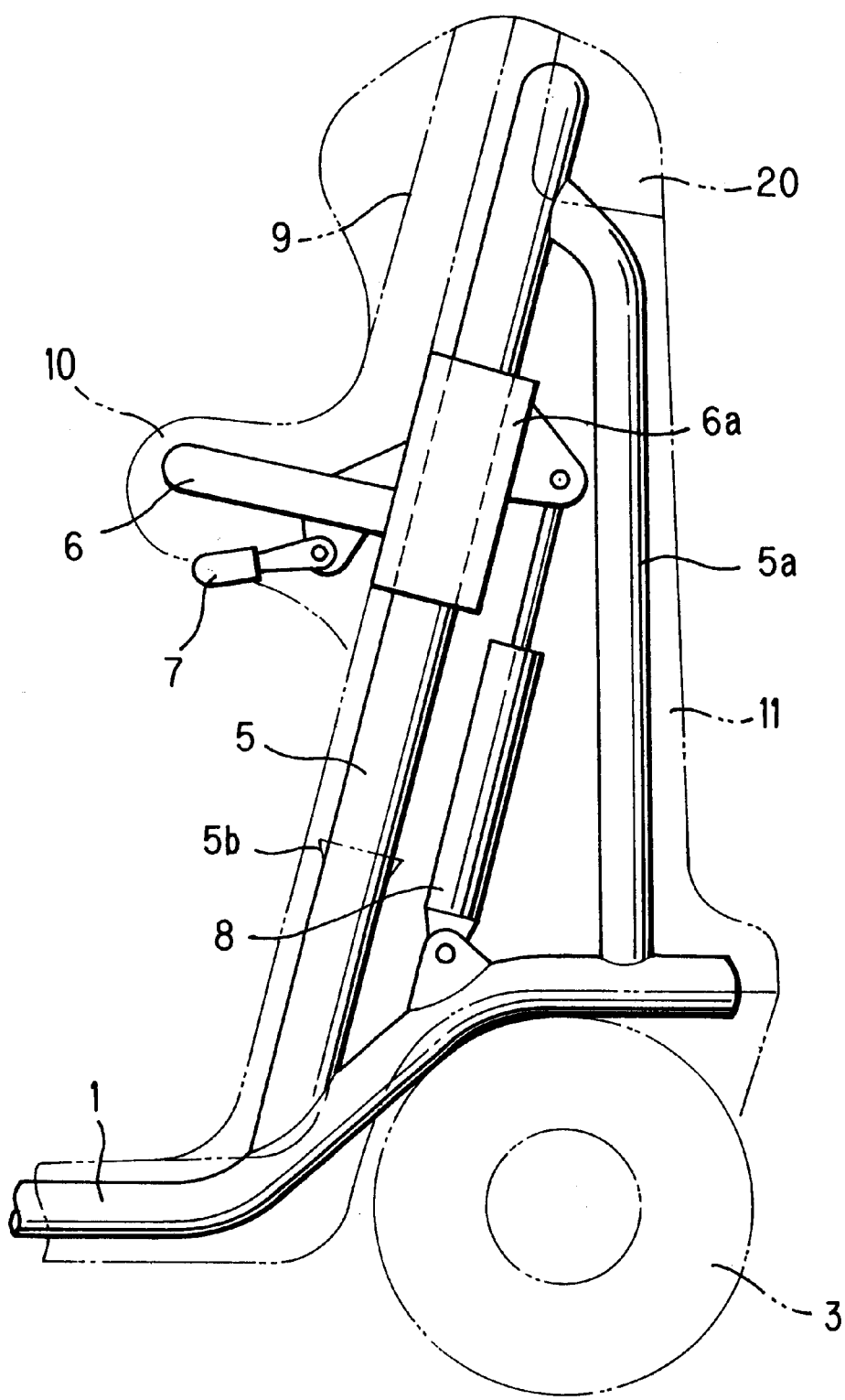
FIG. 4 is a side view partially showing the seat of the embodiment of the present invention.
Figure 5:
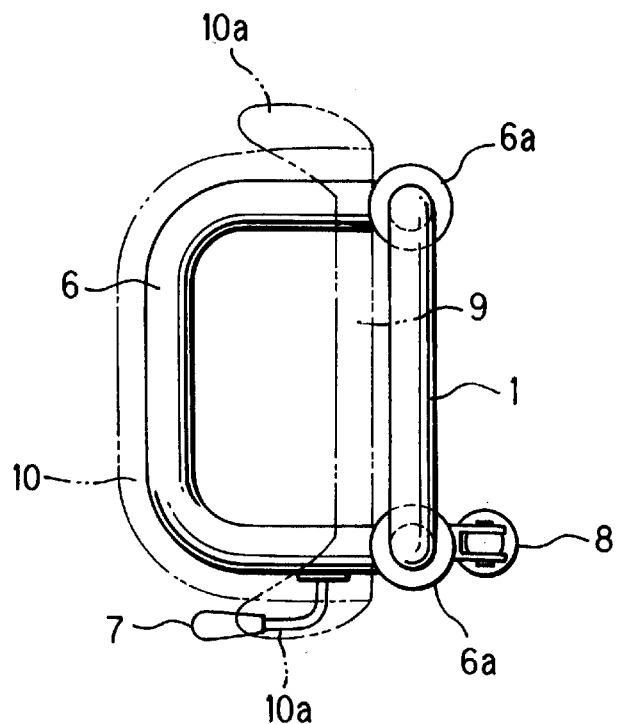
FIG. 5 is a plan view partially showing the seat of the embodiment of the present invention.

As shown in FIGS. 3 through 5, an inverted U-shaped seat frame 5 is attached at the rear portion of floor frame 1 with its top inclined to the rear. Seat frame 5 is supported at its upper rear part by a support frame 5a which stands at the rear end of floor frame 1, forming a triangular shape with seat frame 5 and support frame 5a, in the side view.

A seat post 6 (seat base frame) has a slider 6a which is fitted on and slid along the outer surface of seat frame 5 and can slide up and down along seat frame 5. This seat post 6 is moved up or down by electric power, the force of an air cylinder 8 or manual force by actuating a lever 7 projected sideward from seat post 6. A seat 10 integrally formed with a backrest 9 and having a short front-to-rear dimension is attached to seat post 6. In seat 10, a pair of holder portions 10a are projected forward at both sides of backrest 9, so that the holder portions 1a embrace the rider's hip and back when the rider is seated on seat 10. The seat 10 is laid out in front of the central axis of rear wheels 4 when the seat is set at the topmost position.

Figure 8:
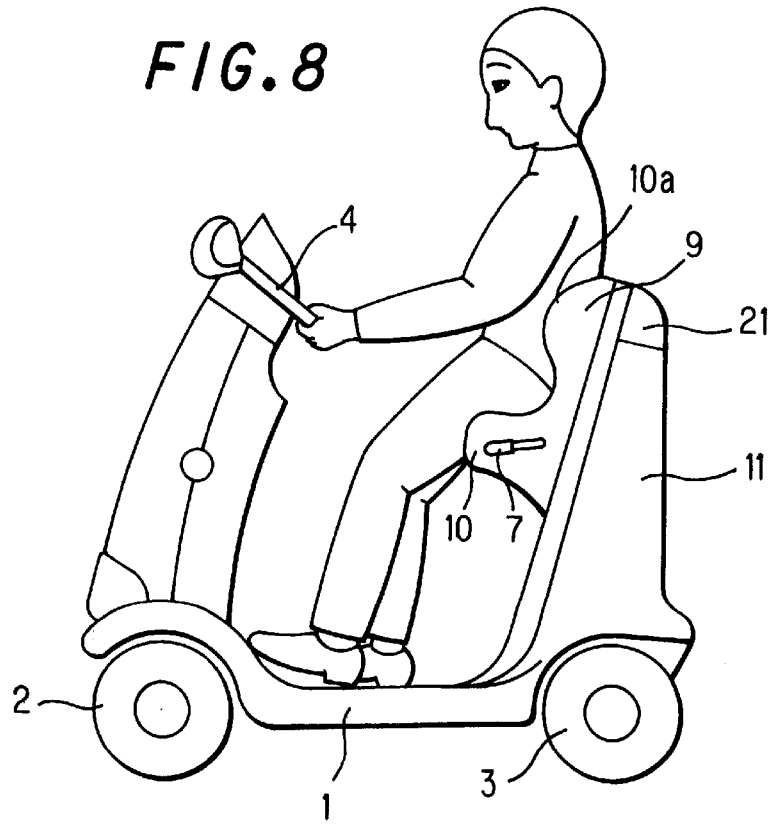
FIG. 8 is a side view showing the riding posture of the rider of the embodiment of the present invention.

As stated above, the entire seat 10 is adapted to slide up and down along seat frame 5 as slider 6a slides. Positioning of the seat at the lower end is set by a stopper 5b. Seat post 6 supports the weight of the rider. Since the rider is not seated deeply but sets their buttocks perchingly, the seat post is designed to be shorter with respect to the front-to-rear direction than the seat of a normal wheel chair. Therefore, when the user rides on the vehicle at a high position as shown in FIG. 8, the legs are set extended forwards so that the user can keep their posture easily. By actuation of the lever 7, slider 6a moves up and down hence the entire seat moves up and down. Seat 10 may be set at a high position when the user rides around the town and makes full use of direct communication with foot passengers, or the seat may be set at a low position when the user needs to secure stability because of slopes or other reasons, thus making it possible to freely change the height of the level of view.

Figure 1:
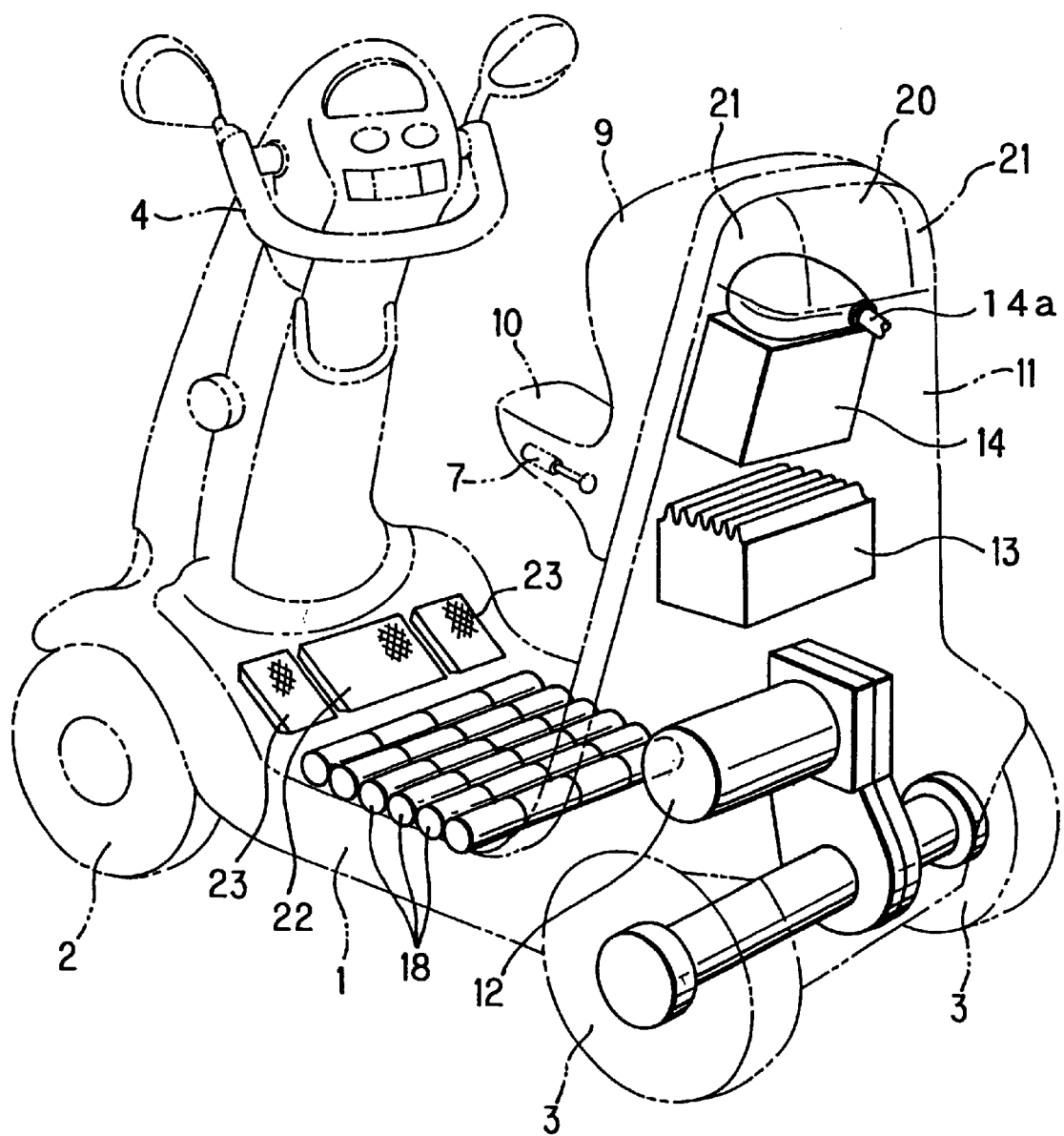
FIG. 1 is a perspective view showing an electric motor vehicle of the embodiment of the present invention.
Figure 2:
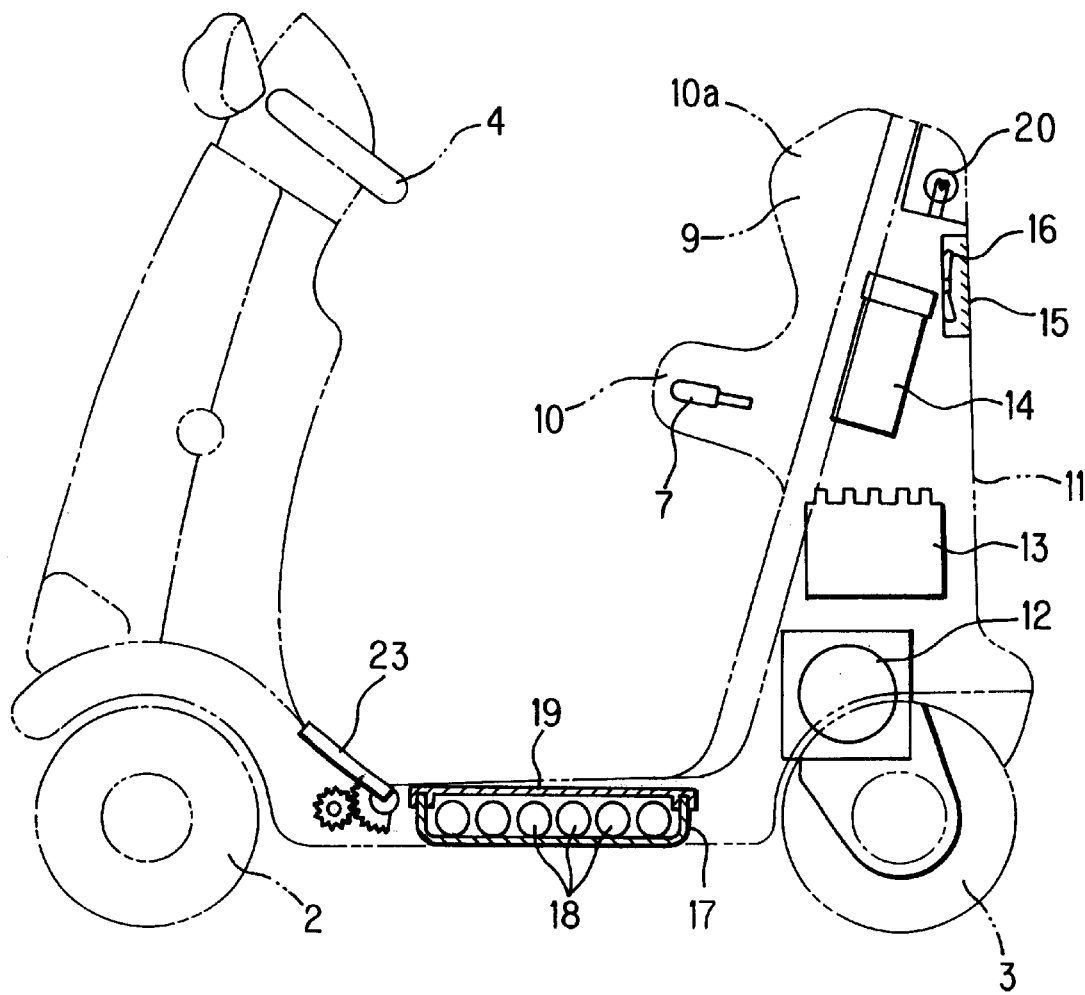
FIG. 2 is a side view mainly showing the driving mechanism of the embodiment of the present invention.
Figure 6:
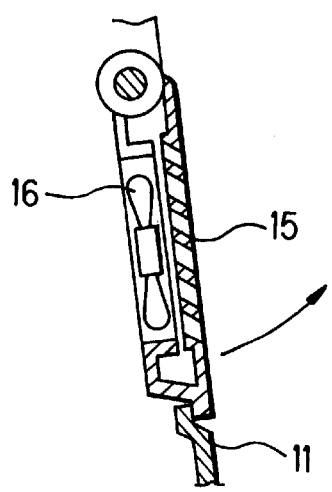
FIG. 6 is a vertical sectional side view showing a cooling fan of the embodiment of the present invention.

As shown in FIGS. 1 and 2, a rear-side housing 11 is attached swelling out to the rear. In this rear-side housing 11, an electric motor 12, controller 13 and charger 14 are arranged in this order from the bottom while a cooling fan 16 with a louver 15 is attached at the upper part of the housing. As shown in FIG. 6, the upper side of cooling fan 16 with louver 15 is hinged on rear-side housing 11 and can be opened upward so that a reel cord 14a of charger 14 can be pulled out for charging. Cooling fan 16 discharges heat from electric motor 12 and controller 13 externally through louver 15.

As shown in FIGS. 1 and 2, a battery storage portion 17 is provided in the center of floor frame 1 so that batteries 18 are accommodated therein and covered by a floor cover 19. Here, it is assumed that batteries 18 are Ni—Cd, Ni-MH or Li-ion batteries and the batteries are arranged under the large flat floor. This battery storage portion 17 under the floor is large enough that a large capacity of batteries can be accommodated, thus replacement is not needed. In terms of the center of gravity of the vehicle, it is preferable that the batteries are laid out at a low position between the front and rear wheels 2 and 3. The batteries are placed in battery storage portion 17, the space closed by floor cover (may be a floor mat) 19 and sealed with a gasket interposed around the abutment. When floor cover 19 is removed from above, the batteries can be easily replaced, in a case if it may be so required to.

As shown in FIGS. 1 and 2, at the top of rear-side housing 11, a stop lamp 20 is attached at the center with turn indicator lamps 21 on both sides thereof.

Figure 7:
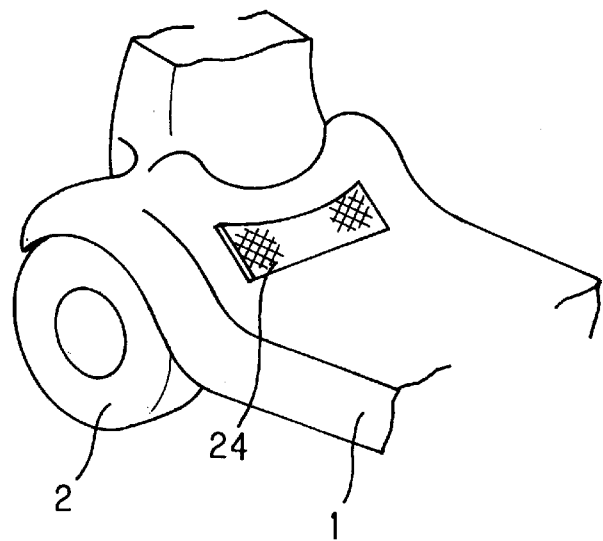
FIG. 7 is a perspective view showing a combined accelerator and brake pedal of the embodiment of the present invention.

As shown in FIG. 1, arranged in the center of the inclined area at the front part of floor frame 1 is an extended brake pedal 22 with accelerator pedals 23 on both sides thereof. Instead, as shown in FIG. 7, an extended combined accelerator and brake pedal 24 which accelerates the vehicle when it is pressed down and retards the vehicle when it is released can be provided. Here, when an Akckermann steering gear is adopted, the space between the left and right front wheels 2 are unused. Since brake pedal 22 and accelerator pedals 23 are arranged at the center and at both sides in the unused space, respectively, this configuration makes the best use of the space. The aforementioned pedals 22 and 23 are arranged on the inclined area that connects the fenders of the front wheels and the floor, so that they also functions as a footrest.

As shown in FIG. 8, the rider is perchingly seated on seat 10 and leaning on backrest 9 in an almost standing posture, and actuates accelerator pedal 23 and brake pedal 22 or combined accelerator and brake pedal 24 by either their left or right foot whilst controlling steering handle 4 with their hands.

As has been described heretofore, since the present invention is configured as above, the rider rides on the vehicle in an almost standing posture, being perchingly seated on the seat and leaning on the backrest, the rider will feel less fatigued and will have good vision from a high point of view. This configuration also provides convenience for making conversation with a companion who walks alongside because the user is able to face the companion at the same level of view. Further, the position or height of the seat can be adjusted by lever actuation. The electric motor, controller and other necessary parts are housed inside the rear-side housing, which improves in appearance and can be ventilated by the cooling fan. Since the heavy batteries are arranged at a low position in the floor frame and the seat is laid out in front of the rear wheel axis, the vehicle presents good stability.

Accelerating and braking operations can be conveniently made by either left or right foot. Further, since the vehicle has a stop lamp and turn indicator lamps, the user is able to notify their intention to those around on public roads.

What is claimed is:

1. An electric motor vehicle comprising:

a floor frame having raised front and rear portions;

four wheels arranged, two at the front and two at the rear of the floor frame;

a steering handle projected upward in the front portion for steering the front two wheels;

an electric motor for driving the two rear wheels;

a seat frame projected upward in the rear portion; and a seat with a backrest, adjustable in height and mounted on the seat frame, wherein the seat frame is supported by a support frame which stands at the rear end of the floor frame and attaches to an upper end of the seat frame, the seat frame and the support frame forming a triangular shape, in a side view, and furthermore, a seat post is fitted on and about the seat frame and slides linearly about the seat frame, the seat being integrally formed with the backrest and attached to the seat post and contoured and positioned a distance from the floor frame in an operating position such that a rider perchingly sits on the seat and rides on the vehicle in an almost standing posture.

2. The electric motor vehicle according to claim 1, wherein the position of the seat can be automatically or manually moved up and down by actuating a lever projected on the side of the seat.

3. The electric motor vehicle according to claim 1, wherein a battery storage portion is arranged in the center of the floor frame and covered by a floor cover.

4. The electric motor vehicle according to claim 1, wherein heat discharged from the electric motor and controller is adapted to flow under the seat into a cooling fan.

5. The electric motor vehicle according to claim 1, further comprising: a rear-side housing attached in the rear of the seat frame, and a stop lamp arranged at the top center of the rear-side housing with a pair of turn indicator lamps on both sides thereof.

6. The electric motor vehicle according to claim 1, further comprising: an extended braking pedal is arranged at the center on the front inclined area of the floor frame with a pair of accelerator pedals arranged on the left and right sides thereof.

7. The electric motor vehicle according to claim 1, wherein an extended accelerator and brake combined pedal which accelerates the vehicle when it is pressed down and retards the vehicle when it is released is arranged on the front inclined area of the floor frame.

8. An electric motor vehicle comprising:

a floor frame having raised front and rear portions;

four wheels arranged, two at the front and two at the rear of the floor frame;

a steering handle projected upward in the front portion for steering the front two wheels;

an electric motor for driving the two rear wheels;

a seat frame projected upward in the rear portion; and a seat with a backrest, adjustable in height and mounted on the seat frame, wherein the seat frame is supported by a support frame which stands at the rear end of the floor frame and attaches to an upper end of the seat frame, the seat frame and support frame forming a triangular shape, in a side view, and furthermore, a seat post is fitted on and about the seat frame and slides linearly about the seat frame, the seat being integrally formed with the backrest and attached to the seat post, the seat having a front-to-rear dimension that is less than a top-to-bottom dimension, wherein in an operating position, the seat is positioned a distance from the floor frame such that a rider rides on the vehicle in an almost standing posture.

9. An electric motor vehicle comprising:

a floor frame having raised front and rear portions;

four wheels arranged, two at the front and two at the rear of the floor frame;

a steering handle projected upward in the front portion for steering the front two wheels;

an electric motor for driving the two rear wheels;

a seat frame projected upward in the rear portion; and a seat with a backrest, adjustable in height and mounted on the seat frame, wherein the seat frame is supported by a support frame which stands at the rear end of the floor frame and attaches to an upper end of the seat frame, the seat frame and support frame forming a triangular shape, in a side view, and furthermore, a seat post is fitted on and about the seat frame and slides linearly about the seat frame between a point of attachment of the support frame to the seat frame and the floor frame, the seat being integrally formed with the backrest and attached to the seat post, so that a rider rides on the vehicle in an almost standing posture.

10. The electric motor vehicle according to claim 9, wherein the position of the seat can be automatically or manually moved up and down by actuating a lever projected on the side of the seat.

11. The electric motor vehicle according to claim 9, wherein a battery storage portion is arranged in the center of the floor frame and covered by a floor cover.

12. The electric motor vehicle according to claim 9, wherein heat discharged from the electric motor and controller is adapted to flow under the seat into a cooling fan.

13. The electric motor vehicle according to claim 9, further comprising: a rear-side housing attached in the rear of the seat frame, and a stop lamp arranged at the top center of the rear-side housing with a pair of turn indicator lamps on both sides thereof.

14. The electric motor vehicle according to claim 9, comprising: an extended braking pedal arranged at the center on the front inclined area of the floor frame with a pair of accelerator pedals arranged on the left and right sides thereof.

15. The electric motor vehicle according to claim 9, wherein an extended accelerator and brake combined pedal which accelerates the vehicle when it is pressed down and retards the vehicle when it is released is arranged on the front inclined area of the floor frame.

* * * * *